Aug. 22, 1933.　　K. H. BROWNLEE　　1,923,294
VENTILATOR FOR VEHICLE BODIES
Filed Dec. 8, 1930
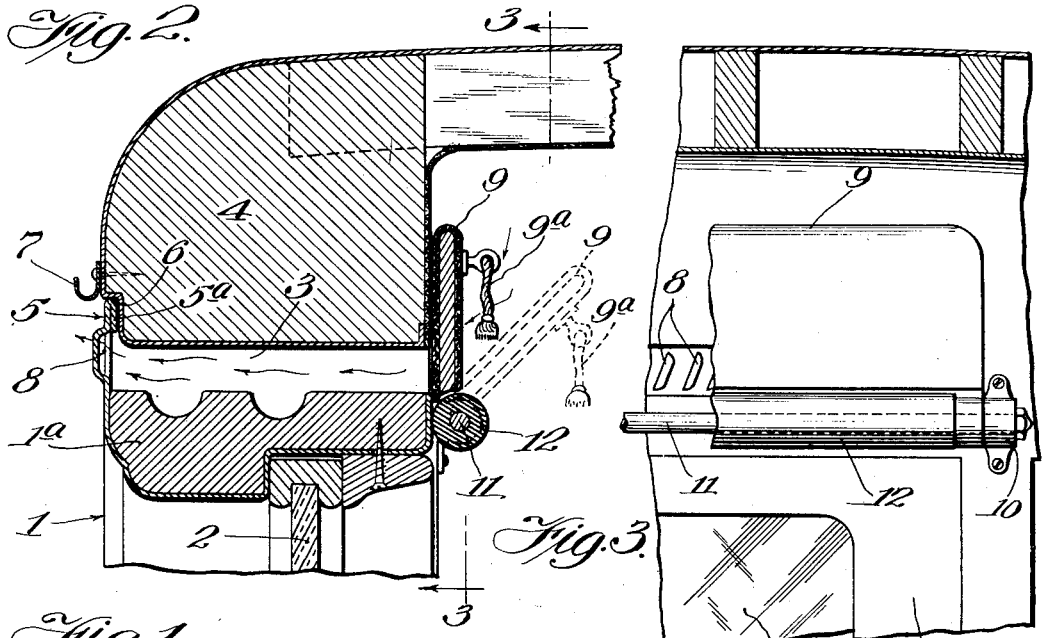
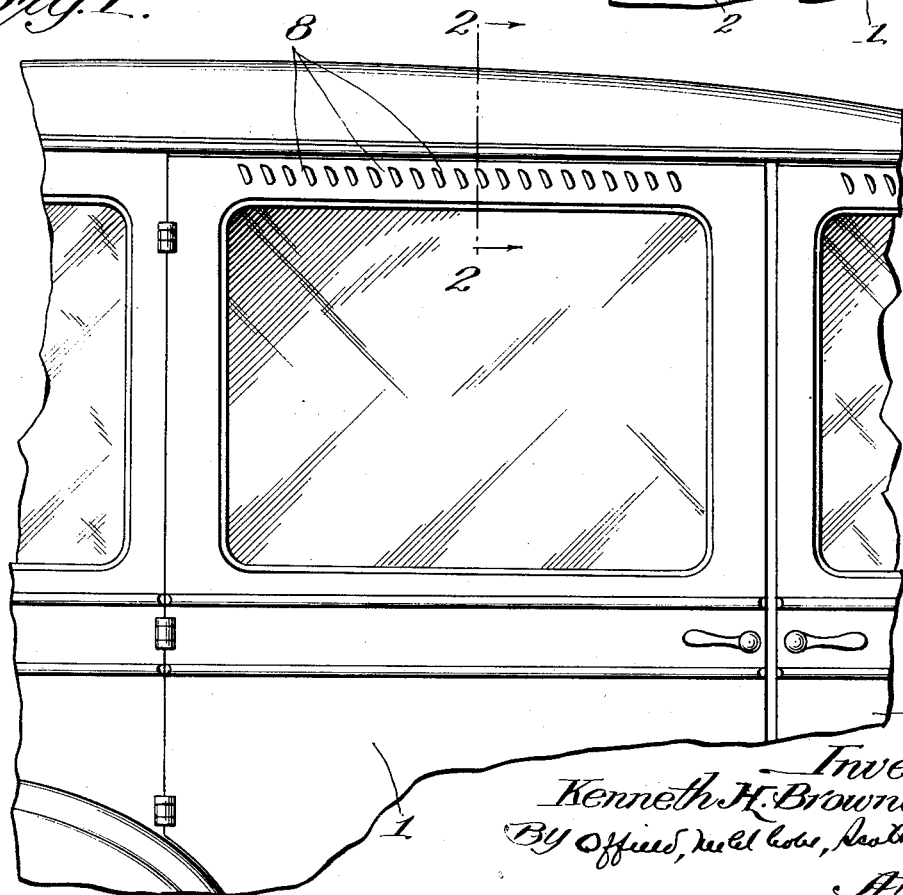
Inventor
Kenneth H. Brownlee Patented Aug. 22, 1933

1,923,294

UNITED STATES PATENT OFFICE 1,923,294

VENTILATOR FOR VEHICLE BODIES

Kenneth H. Brownlee, Evanston, Ill.

Application December 8, 1930. Serial No. 500,705

12 Claims. (Cl. 98—2)

This invention relates to improvements in ventilators for vehicle bodies, and more particularly to ventilators intended primarily to promote the requisite circulation of air through the interior of a closed vehicle body without unpleasant drafts and to serve as an outlet for the foul air without offering at the same time an inlet for rain and snow.

The problem of ventilation of closed vehicle bodies during cold or inclement weather is not so much a matter of providing inlets for fresh air as of providing suitable and properly arranged outlets for the foul air. Vehicle bodies are rarely of an air-tight construction, so that there is usually considerable leakage through the floor and around the windows to admit fresh air without any special provision being made for the purpose. However, to maintain a constant change of air requires circulation and this necessitates an outlet, as for instance by partially lowering a window at the rear of the body compartment. This method of circulation or ventilation while effective, is not altogether satisfactory inasmuch as the opening is not weather-proof.

Ventilators for this purpose have heretofore been of the type which are inserted in the window openings of the door frame or built into the roof or other parts of the body, and therefore fall within the catagory of accessories which are expensive and usually involving the mutilation of the body in order to install.

The ventilator herein to be disclosed is essentially of the so-called "built-in" type in the sense that it would be included in the original construction of the vehicle body, but having the advantage that it can be done without increasing the cost of manufacture for the reason that it makes use of parts which are already provided, and by a slight rearrangement are converted into a simple and effective ventilator.

In the first place, for the air passageway the usual clearance space between the top of the door and door frame is utilized and outside openings or louvers from this passageway are formed along the upper edge of the door. And finally, the sealing strip which ordinarily projects downwardly along the inside of the door frame to seal this clearance space is converted into a hinged shutter which serves both as a damper and a deflector to avoid drafts.

A ventilator embodying the novel features above enumerated is disclosed in the accompanying drawing, in which Figure 1 is a view in side elevation of a section of a vehicle body with a door equipped with the ventilator;

Figure 2 is an enlarged detail view in section taken on line 2—2 of Figure 1; and Figure 3 is a fragmentary view in section as taken on line 3—3 of Figure 2.

The ventilator is adapted to be applied to or incorporated in any closed vehicle body of standard construction, and as a part of the door construction. As shown the body of the vehicle is of a wood and steel construction, the structural details of which may be omitted. The doors 1 are hung in frames which surround the door openings, and are hinged to open outwardly either in a forward or rearward direction. The lower portion of the door frame is hollow and forms a well for the sliding glass window panel 2 for the window opening in the upper portion.

As heretofore explained, it is common practice in body construction to provide a clearance space 3 between the top rail 1$^a$ of the door and the adjacent member or rail 4 of the door sash, which may vary in different makes of bodies from ⅛ to ¼ of an inch or even more, the purpose of this clearance being to allow ample room for distortion of the body and relative shifting movement between body and door which otherwise would cause binding and possible breakage of the glass window panel. In case this clearance space between door and door frame should be very small, the only departure from the standard construction would be to increase it to at least ¼ of an inch, thereby forming a narrow passage of about six square inches in area, assuming the door to be the usual 24 inches in width.

In the standard body construction the door and door frame are usually of wood, entirely or partially enclosed or covered with sheet metal, so that it would be a simple matter to increase the clearance to any desired dimension by merely decreasing the width of the top rail 1$^a$ of the door. Again, the metal sheeting on the door is generally shaped to provide an upstanding flange 5 along the outer edge of the top rail of the door which extends over the clearance space and overlaps the lower edge of the door sash 4, which may be rabbeted as at 6 to bring the flange flush with the edge of the roof and afford a weather-tight joint just beneath the gutter strip 7.

Thus far, then, the door and body construction does not depart from the usual practice except perhaps to increase the width of the clearance space 3 along the upper edge of the door. Now to convert these parts into a ventilator it is only necessary to provide a series of small louvers or openings 8 in the flange 5 along the edge of the door and which can be stamped out in the operation of fabricating the door. As shown in Figure 2, the louvers extend vertically of the flange and are slightly longer than the height of the clearance space, and the edge portion above the louvers is bent double to form a marginal head 5a, although this, of course, is a matter of choice. As is common in louvered openings, the metal along one side is flared or bulged outwardly from the plane of the material in which the openings are formed, so that they face or open edgewise or laterally rather than directly outward, the side louvers in the hood over the motor of a vehicle being a familiar example of this arrangement. Thus, in this case the louver openings face toward the rear of the vehicle and are slightly oblique to the vertical so that when the vehicle is in motion rain and snow cannot drive through the openings. With the louvers thus arranged it is apparent that the rush of air past the rearwardly facing openings creates a suction tending to draw the air from the body compartment and thus promote a positive circulation without offering an entrance for rain and snow even when the vehicle is not in motion.

Thus it will be seen that the clearance space or passage 3 in direct communication with the outside atmosphere through the row of louvers 8 provides a direct passage for the air from the compartment being ventilated, providing the passage is open along its inner edge to the interior of the body compartment.

Now, as already explained, it is the practice to seal the clearance space between the top of the door and the door frame by a sealing strip of stiff fibre board covered with the interior lining fabric, this strip extending across the upper edge of the door frame and overlapping the inner face of the top rail of the door which is also covered with fabric and thus providing an air-tight seal when the door is closed.

Now, in the present construction this strip is retained, but in so doing it is converted into an adjustable shutter 9 pivoted at its ends on opposite sides of the door sash, so that it is free to turn about its lower edge in the manner of a damper. In other words, the fixed sealing strip is replaced by a hinged shutter which may be of metal or wood, plain or fabric covered, to harmonize with the interior finish of the vehicle body. This shutter is journalled in suitable bearing fixtures 10, 10 mounted on opposite sides of the door frame on a line just below the top edge of the door, the bottom edge of the shutter being preferably secured at its ends to a rod 11 which is covered by a tubular sheath of rubber or a heavy pile fabric 12 so that a close sealing contact is maintained between the top rail of the door and said shutter when the door is closed. The shutter extends entirely across the door and is of such a width that its free edge not only extends above the clearance space or air passage, but terminates near the top of the compartment.

In the mounting of the shutter, a suitable type of friction bearings are used so that it can be adjusted by hand and yet will remain in that position against the vibration and jarring of the vehicle in motion. Thus the shutter may be swung upwardly into a vertical position over the entrance to the air passage and thus shut off the escape of air from the interior of the vehicle,—in other words, rendering the ventilator inoperative, as would be proper when driving with the windows open. However, by swinging the shutter upwardly and downwardly by means of a knob or pull cord 9a, provided for the purpose, to an angle of, say, 45° to the vertical (as shown in dotted lines in Figure 2), the entrance to the passage is now uncovered to the passage of air. It will be observed, however, that the shutter forms a deflector or baffle which prevents air being drawn through the passage from the lower strata, but only from the stratum immediately adjacent the top of the compartment. The advantage of this arrangement is twofold: In the first place, it prevents the creation of currents of air or drafts over the occupants of the vehicle by withdrawing the air from the ceiling of the compartment, and, secondly, it exhausts the space where the foul air accumulates, namely, along the ceiling.

It may be stated in connection with the action of the ventilator, that the withdrawal of air takes place when the vehicle is in motion and to the extent determined by the entrance of fresh air either by leakage or through regular inlets. However, when the vehicle is standing still, the conditions are somewhat different, if not reversed. In other words, the air may under some conditions enter through the ventilators, and where this occurs the air is deflected upwardly against the ceiling and does not strike the occupants directly or create an objectionable draft.

Ventilators designed and arranged as herein described have the advantage of promoting confortable conditions within a closed vehicle, regardless of the severity of exterior conditions which ordinarily would require windows to be tightly sealed. Moreover, they are capable of being included in the body construction at very little additional expense, since they utilize the clearance space above the door, and by an ingenious arrangement of external louvers and the conversion of a sealing strip into an adjustable shutter and deflector, a simple and effective control of the ventilator is provided.

The details of construction and manner of installation of the ventilator may be variously modified without departing from the spirit of the invention, and therefore I do not wish to be limited in either respect except in so far as the scope of the invention is defined by the appended claims.

I claim as my invention:—

1. A ventilator construction for closed vehicle bodies, comprising a space between the top frame member of the door and the corresponding member of the body door frame and forming an air passage between the interior of the body and the external atmosphere when the door is closed, and a shutter mounted on the interior of the body for sealing contact along the upper edge of the door in closed position and normally adjustable to open or close the entrance to said passage.

2. A ventilator for closed vehicle bodies comprising a space between the top edge of the door and the adjacent member of the body door frame of sufficient width to form an air passage between the interior of the body and the outer atmosphere when the door is closed, means at the outer end of said passage for rendering the external entrance weatherproof, and an adjustable shutter at the inner end of said passage for regulating the flow of air therethrough.

3. The combination with a vehicle body having a hinged door, of a ventilator comprising an air passage between the upper edge of the door and the adjacent member of the door frame and opening into the interior of the body, and a flange along the upper edge of said door extending over the outer end of said passage when said door is closed, and provided with openings therethrough.

4. The combination with a closed vehicle body having a hinged door, of a ventilator utilizing the clearance space between the upper edge of the door and the adjacent edge of the door frame as an air passage, said door having a portion along its upper edge projecting across said clearance space when said door is closed and having a plurality of louvers therein, and means for controlling the flow of air through said passage.

5. The combination with a closed vehicle body having a hinged door, of a ventilator utilizing the clearance space between the upper edge of the door and the adjacent edge of the door frame as an air passage, said door having a flange along its upper edge projecting across the outer end of said passage when said door is closed and having a plurality of louvers therein, and a shutter for controlling the passage of air through the inner end of said passage.

6. A ventilator for closed vehicle bodies having a clearance space between the top frame member of the door and the adjacent member of the door frame of said body wide enough to form an air passage, and said door having a flange along the top edge adapted to overlap the door frame above when said door is closed, comprising a plurality of louvers in said flange communicating with said passage, and an adjustable shutter mounted on the interior of said body and adapted in one position to close said air passage and in another position to control the path of the air to said passage.

7. In a closed vehicle body the combination with a hinged door having a clearance space of substantial width between the top rail thereof and the body frame member above, and a flange along the outer edge of said top rail adapted to overlap said clearance space when said door is closed, of means for converting said clearance space into a ventilating air passage consisting of providing said door flange with louvered openings communicating with said clearance space, and a shutter pivotally mounted on the interior of said body and adapted to be adjusted to cover and uncover the inner opening to said clearance space.

8. A ventilator for closed vehicle bodies having a clearance space between the top edge of the door and the door sash wide enough to form an air passage, and said door having a flange along the outer top edge adapted to extend over the outer end of said passage when said door is closed and having openings therein communicating with said passage, and a manually adjustable shutter pivotally mounted on the interior of said body below the inner end of said passage and adapted to be swung about its lower edge to close said passage in one position and in another position to deflect the air toward the ceiling of the body compartment.

9. In a closed vehicle body the combination with a hinged door having a passage of substantial width between the top rail thereof and the body frame member above, and a flange along the top edge of said door extending over the outer end of said passage when said door is closed, and provided with louvers therein, and a shutter mounted on the interior of said body with its lower edge having sealing contact with the door below the passage when the door is closed, said shutter being adjustable to regulate the flow of air through said passage.

10. In a closed vehicle body, the combination of a door having a space of substantial width between the top rail thereof and the body frame above and forming a transverse passage between the interior and exterior of the body compartment when the door is closed, and a shutter pivotally mounted to swing about its lower edge, the same having sealing contact with the door in closed position, said shutter when swung into one position being adapted to close the inner end of said passage and in another position to direct the flow of air through said passage upwardly within the interior of the body.

11. A ventilator construction for closed vehicle bodies, including a space between the top edge of a door thereof and the body member above to provide an air passage between the interior and exterior of said body when said door is closed, a member extending along the outer end of said passage and arranged to provide a weather-proof external opening therefor, and means for opening and closing the inner end of said passage.

12. A ventilator construction for closed vehicle bodies, including a space above the top edge of the door wide enough to form an air passage communicating with the interior of the body, when the same is closed, said door having a plurality of exterior weather-proof openings connecting the outer end of said passage and means for opening and closing the passage from the interior of the body.

KENNETH H. BROWNLEE.